United States Patent
Schunk et al.

(10) Patent No.: US 8,691,181 B2
(45) Date of Patent: Apr. 8, 2014

(54) METHOD FOR PRODUCING SYNTHESIS GAS

(75) Inventors: Stephan Schunk, Heidelberg-Rohrbach (DE); Armin Lange De Oliveira, Mannheim (DE)

(73) Assignee: BASF SE, Ludwigshafen (DE)

( * ) Notice: Subject to any disclaimer, the term of this patent is extended or adjusted under 35 U.S.C. 154(b) by 41 days.

(21) Appl. No.: 12/599,748

(22) PCT Filed: May 9, 2008

(86) PCT No.: PCT/EP2008/055770
§ 371 (c)(1),
(2), (4) Date: Nov. 11, 2009

(87) PCT Pub. No.: WO2008/138899
PCT Pub. Date: Nov. 20, 2008

(65) Prior Publication Data
US 2010/0305221 A1    Dec. 2, 2010

(30) Foreign Application Priority Data

May 11, 2007  (DE) .......................... 10 2007 022 723

(51) Int. Cl.
*C01B 3/24* (2006.01)
*C01B 3/38* (2006.01)

(52) U.S. Cl.
USPC .......................................... 423/650; 252/373

(58) Field of Classification Search
USPC .......................................... 452/373; 423/650
See application file for complete search history.

(56) References Cited

U.S. PATENT DOCUMENTS

| | | | | |
|---|---|---|---|---|
| 4,229,184 A | * | 10/1980 | Gregg | ............................ 48/62 R |
| 4,552,741 A | * | 11/1985 | Melchior | ....................... 423/359 |
| 4,668,494 A | | 5/1987 | Van Hook et al. | |
| 4,756,806 A | | 7/1988 | Krist et al. | |
| 6,461,539 B1 | * | 10/2002 | Gaffney | ........................ 252/373 |
| 6,670,058 B2 | | 12/2003 | Muradov | |
| 7,033,570 B2 | * | 4/2006 | Weimer et al. | ................ 423/650 |
| 7,125,913 B2 | * | 10/2006 | Pan et al. | ....................... 518/703 |
| 7,211,606 B2 | * | 5/2007 | Baek et al | ....................... 518/700 |
| 2002/0006968 A1 | * | 1/2002 | Abbott | ............................. 518/704 |
| 2004/0127351 A1 | * | 7/2004 | Basile et al. | .................. 502/303 |
| 2006/0016722 A1 | * | 1/2006 | Espinoza et al. | ................ 208/14 |

FOREIGN PATENT DOCUMENTS

| | | |
|---|---|---|
| DE | 39 33 285 | 4/1991 |
| EP | 0 137 467 | 4/1985 |
| EP | 548889 A1 * | 6/1993 |

OTHER PUBLICATIONS

Olah, G. A. et al, "Fossil Fuels and Climate Change", Beyond Oil and Gas : The Methanol Economy, Chapter 7, pp. 72-83 (2006).

* cited by examiner

*Primary Examiner* — Melvin C Mayes
*Assistant Examiner* — Kenneth Vaden
(74) *Attorney, Agent, or Firm* — Oblon, Spivak, McClelland, Maier & Neustadt, L.L.P.

(57) ABSTRACT

A process for preparing and converting synthesis gas, which has a plurality of different operating states which consist essentially of mutually alternating (i) daytime operation and (ii) nighttime operation, daytime operation (i) comprising principally dry reforming and steam reforming with supply of renewable energy, and nighttime operation (ii) comprising principally the partial oxidation of hydrocarbons, and the synthesis gas produced being used to produce products of value.

17 Claims, No Drawings

METHOD FOR PRODUCING SYNTHESIS GAS

The invention relates to a continuous process for processing hydrocarbons to chemical products of value or liquid fuels. The hydrocarbons used are preferably methane, natural gas or biogas. The process also utilizes carbon dioxide which originates from stationary or nonstationary systems, the process being supported partly on the use of renewable energy sources. In addition to the use of renewable energy sources, the process, by means of a suitable process control system, is also operated partly through the utilization of process energy which is released as thermal energy in individual process steps.

The process also relates to dry reforming, steam reforming and partial oxidation, which affords a defined synthesis gas which is converted in the course of the process (for example by FT (Fischer Tropsch) or methanol synthesis) to products of value. In the case of the solar-supported performance of the process, predominantly strongly endothermic reactions are performed during daytime operation, and predominantly exothermic reactions during nighttime operation, although an excess proportion of energy obtained during nighttime operation is utilized to maintain the endothermic reactions. The combined utilization of a renewable energy source and the energy formed during the operation allows the process to be performed in a very energy-efficient manner, which means that the formation of carbon dioxide in the course of the process is minimized.

Utilization of carbon dioxide as a starting material in chemical processes is very unfavorable in many cases, since carbon dioxide is an exceptionally inert compound, and a high energetic barrier has to be overcome in order to react carbon dioxide. Typically, the carbon dioxide obtained in power generation or in chemical processes is considered to be a waste product and is emitted into the atmosphere. The emission of carbon dioxide into the atmosphere, as occurs, for example, as a result of the combustion of fossil fuels in stationary systems (for example power plants) or nonstationary systems (for example automobiles), is exceptionally undesirable owing to the properties of carbon dioxide as a greenhouse gas and its contribution to global climate change. The minimization of the emission of carbon dioxide into the atmosphere is an essential aim in order to reduce or to prevent the adverse effects of climate change.

There already exists processes for preventing or reducing the emission of carbon dioxide into the atmosphere. Some of these processes are based on the sequestration of carbon dioxide in subterranean or submarine deposits (see also G. A. Olah, A. Goeppert, G. K. Surya Parkash; Beyond Oil and Gas: The Methanol Economy; Wiley-VCH (2006) Chapter 7, p. 82). However, such processes are considered to be unfavorable owing to the overall energy balance, since supply of carbon dioxide into deposits can only be employed with expenditure of energy, which generates further carbon dioxide. Apart from this, the possible effects which may be associated with the storage of carbon dioxide in large amounts are substantially unknown.

The use of renewable energy sources for performing industrial scale processes in which hydrocarbons or carbon are used as starting materials is known.

DE 3933285 discloses a process for continuously generating synthesis gas by the solar reforming of methane, wherein the nighttime cycle is operated by means of auxiliary firing using methane and the carbon dioxide formed is stored intermediately for $CO_2$ reforming. Coupling of the process with steam reforming is not mentioned. The process affords merely a synthesis gas with a very high carbon monoxide content. The utilization of heat of reaction released, which arises in the partial oxidation of methane or in the subsequent conversion of the synthesis gas, is not described.

Solar gasification plants for coal are known, for example, from U.S. Pat. No. 4,229,184, wherein the gasification of coal affords a product gas which has a high proportion of carbon monoxide. Furthermore, U.S. Pat. No. 4,229,184 also does not give any solution as to how the coal gasification plant can be utilized in continuous operation, i.e. a cycle between daytime and nighttime operations.

U.S. Pat. No. 4,668,494 discloses a process for chemical synthesis, which relates to the steam reforming of hydrocarbons or gasification of carbon-containing fuels and can be operated utilizing solar energy. The solar energy is utilized to produce a CO-free ammonia synthesis gas which can be combusted for power generation in the operating phase of the plant in which no solar radiation is available, in order to maintain the operation. The process forms nitrogen oxide-containing combustion products which have to be captured as nitric acid.

U.S. Pat. No. 6,670,058 and U.S. Pat. No. 7,033,570 disclose the utilization of solar energy for thermal decomposition of hydrocarbons to produce hydrogen, which forms carbon as a by-product. Such processes have the advantage that, in the case of preparation of hydrogen from fossil fuels, only very small amounts of carbon dioxide are released. No indications of utilization of the process in continuous operation are given.

It was one of the objects of the present invention to develop an economically viable process for converting carbon dioxide which originates from stationary industrial plants or nonstationary plants, for example vehicles, to products of value. The conversion of the carbon dioxide should as far as possible be undertaken on the basis of renewable energy sources and simultaneously be integrated into a very substantially continuous operation.

This object underlying the invention and further objects have been achieved by developing a process in which the reactions of dry reforming, steam reforming and partial oxidation are combined, the endothermic steps being conducted by means of or with the aid of renewable energy sources. In a preferred embodiment, the renewable energy source consists of solar energy.

The process has a plurality of different operating states which consist essentially of mutually alternating (i) daytime operation and (ii) nighttime operation, daytime operation comprising principally dry reforming and steam reforming with supply of renewable energy, and nighttime operation (ii) comprising principally the partial oxidation of hydrocarbons. In a preferred embodiment, the process includes the conversion of the synthesis gas produced to products of value, some of the heat of reaction generated also being used to perform the endothermic process steps.

The terms "daytime operation" and "nighttime operation" relate to the process operation in conjunction with renewable energy sources (for example wind or sun) which are available only within certain periods, the renewable energy source generally being available during daytime operation. It is by no means impossible that operating states which form an intermediate state between daytime operation and nighttime operation also occur, if any energy source is not fully available during daytime operation.

In a preferred embodiment of the process, the process steps of dry reforming of carbon dioxide, steam reforming and partial oxidation are performed with short-chain hydrocarbon compounds having fewer than five carbon atoms and preferably having fewer than three carbon atoms.

In a further preferred embodiment of the process, the reactions of dry reforming of carbon dioxide, steam reforming and partial oxidation are performed with gas mixtures which comprise a plurality of hydrocarbon compounds which have a very high methane content. This makes it possible, in the process which may include a plurality of operating states, to produce a synthesis gas which has a defined overall composition with regard to the carbon monoxide to hydrogen content. The most preferred composition of synthesis gas possesses a carbon monoxide to hydrogen content of 1 to 2 ($CO/H_2$ equal to 1:2), since a synthesis gas of such a composition constitutes a suitable starting basis for producing products of value.

In a preferred process variant, the process is undertaken utilizing solar energy sources. This results in a marked differentiation between the operating states of daytime operation and nighttime operation. During daytime operation, preferably the strongly endothermic reactions of dry reforming and steam reforming are undertaken, and, during nighttime operation, preferably partial oxidation is undertaken, which proceeds exothermically. The exothermic reaction can partly also be performed in such a way that the heat released can be utilized to operate the endothermic reactions. For operation support in nighttime operation or during the operating phase within which not enough solar energy is available, intermediately stored hydrogen excess is combusted or intermediately stored energy is utilized for the process. It is thus also possible during nighttime operation also to perform endothermic reactions to a small degree.

In the case of use of solar energy as the renewable energy source, the process according to the invention is preferably operated in a region in which solar energy is available in a sufficient amount for the whole year. In conjunction with solar energy, the terms "daytime operation" (operation in the hours with sufficient solar radiation for process operation) and "nighttime operation" (operation in the hours with insufficient solar radiation for process operation) also mean that the different operating phases preferably proceed within a day lasting twenty-four hours.

The same considerations regarding the energy balance also apply to the conversion of the synthesis gas to products of value, since Fischer-Tropsch reactions or methanol synthesis from synthesis gas are exothermic processes. The energy obtained in the conversion of synthesis gas, in the context of the inventive operation, is available both during daytime operation and during nighttime operation.

In a further preferred embodiment, the process is performed in such a way that the synthesis gas has the desired composition, in order that it can be converted to products of value in the further process stage. If, in the course of performance of the process, there should be operating phases within which a synthesis gas is prepared with a composition which should not correspond to the composition regarding carbon monoxide relative to hydrogen which is desired for the further processing, this can initially be stored intermediately in a storage tank. Increasing the contribution of steam reforming compared to that of dry reforming supplies a hydrogen-rich to the storage tank until the synthesis gas has the desired ratios between carbon monoxide and hydrogen.

For example, during daytime operation and in the case of use of methane as the hydrocarbon compound used, three moles of methane are required to convert one mole of carbon dioxide when a combination of dry reforming and steam reforming is performed. With regard to the carbon balance, this means that—during daytime operation—a quarter of the carbon converted to synthesis gas consists of the carbon dioxide supplied. If the operating states of daytime and nighttime operation have the same duration and the same conversion, this gives rise to the carbon balance that one eighth of the hydrocarbon processed to synthesis gas was formed from the carbon dioxide. For the conversion of one mole of carbon dioxide in the context of the inventive operations, seven moles of methane thus have to be used.

Some of the processes which relate to the chemical conversion of carbon dioxide describe so-called dry reforming using carbon dioxide. In the case of the dry reforming using carbon dioxide, the latter is contacted at high temperatures with reductive species in the presence of a catalyst. The reductive species are hydrocarbons such as methane, ethane, propane or other hydrocarbons which, under standard conditions, are present in gaseous, liquid or solid form, or hydrogen-rich gases,—such as hydrogen-rich synthesis gas—or hydrogen in pure form. The aim of these reactions is to reduce the carbon dioxide to carbon monoxide.

Some reactions of reagents with carbon dioxide will be detailed here by way of example. In the case of use of hydrogen as the reductive species, owing to the stoichiometric conditions present, one mole of water forms per mole of carbon monoxide obtained. The reaction of carbon dioxide with methane forms two moles of carbon monoxide and two moles of hydrogen, i.e. a synthesis gas with the carbon monoxide to hydrogen ratio of 1 to 1 ($CO/H_2$ equal to 1:1). The reaction of two moles of carbon dioxide with ethane forms four moles of carbon monoxide and three moles of hydrogen, i.e. a synthesis gas with the carbon monoxide to hydrogen ratio of 4 to 3 ($CO/H_2$ equal to 4:3). The reaction of three moles of carbon dioxide with one mole of propane forms 6 moles of carbon monoxide and 4 moles of hydrogen, i.e. a synthesis gas with the carbon monoxide to hydrogen ratio of 3 to 2 ($CO/H_2$ equal to 3:2). The reaction of four moles of carbon dioxide with one mole of butane forms 8 moles of carbon monoxide and 5 moles of hydrogen, i.e. a synthesis gas with the carbon monoxide to hydrogen ratio of 8 to 5 ($CO/H_2$ equal to 8:5).

The examples show that the complete dry reforming of carbon dioxide with linear alkanes follows the general formula:

$$nCO_2 + C_nH_{2n+2} \rightarrow 2nCO + (n+1)H_2$$

The reaction enthalpy of the reaction is strongly endothermic, i.e. energy has to be supplied to perform the reaction.

Since the dry reforming forms a low-hydrogen synthesis gas, such a synthesis gas is unsuitable for the conversion in a process for obtaining long-chain paraffinic hydrocarbons such as diesel, gasoline or waxes according to Fischer-Tropsch, or the conversion to methanol or dimethyl ether. In order to prepare a very hydrogen-rich synthesis gas, the use of short-chain hydrocarbons is preferable. Since the low hydrogen content of the synthesis gas thus produced complicates further use, one possibility is to enrich the carbon monoxide-rich synthesis gas.

Processes for preparing hydrogen-rich synthesis gases are known in principle. For example, hydrogen-rich synthesis gas can be effected by steam reforming of hydrocarbons such as methane or higher hydrocarbons in the presence of steam. For methane, this gives the reaction equation:

$$CH_4 + H_2O \rightarrow CO + 3H_2$$

The reaction enthalpy of the reaction is strongly endothermic, i.e. energy has to be supplied to perform the reaction.

It is clearly evident that a hydrogen-rich synthesis gas is obtained here, in contrast to dry reforming using carbon dioxide. The steam reforming of methane affords a synthesis gas with a ratio of carbon monoxide to hydrogen of 1 to 3 ($CO/H_2$ equal to 1:3). The steam reforming of ethane affords a synthesis gas with a ratio of carbon monoxide to hydrogen of 2 to 5 ($CO/H_2$ equal to 2:5). The steam reforming of propane affords a synthesis gas with a ratio of carbon monoxide to hydrogen of 3 to 7 ($CO/H_2$ equal to 3:7). The steam reforming of butane affords a synthesis gas with a ratio of carbon monoxide to hydrogen of 4 to 9 ($CO/H_2$ equal to 4:9).

The steam reforming of alkanes is described in general by the following formula:

$$C_nH_{2n+2} + nH_2O \rightarrow nCO + (2n+1)H_2$$

As is evident with regard to the stoichiometries of the reaction equations, a coupling of processes for preparing hydrogen-rich synthesis gas such as steam reforming with dry reforming using carbon dioxide may be advisable in order to produce a synthesis gas with a stoichiometry of carbon monoxide to hydrogen of 1 to 2 ($CO/H_2$ equal to 1:2). Such a synthesis gas can be used, for example, to produce chemical—for example methanol or diesel fractions.

According to the invention, such a coupling of the two processes, i.e. the steam reforming and the dry reforming, by a coupling of suitable reactor systems, in each case with the aid of one or more catalyst systems, which are operated in parallel and are designed or dimensioned such that the stoichiometry of the synthesis gas can be established within the desired ratio. A further possibility in accordance with the invention is the use of a single reactor system in which the dry reforming and the steam reforming are performed simultaneously or alternately with the aid of one or more catalyst systems, which also makes it possible to establish and obtain a synthesis gas with a desired ratio of carbon monoxide and hydrogen.

A further method of producing hydrogen-rich synthesis gas is the partial oxidation of alkanes. In this case, the alkane is reacted with oxygen, the reaction equation of the exothermic reaction being specified by way of example for the conversion of methane:

$$CH_4 + \tfrac{1}{2}O_2 \rightarrow CO + 2H_2$$

Through this reaction of methane and oxygen, it is possible to obtain a synthesis gas with a preferred stoichiometry in the context of the present invention, i.e. a ratio of carbon monoxide to hydrogen of 1 to 2 ($CO/H_2$ equal to 1:2), for further processing in, for example, the production of methanol or diesel fractions by the Fischer-Tropsch process.

Both the industrial performance of processes for dry reforming and suitable catalysts for performing the process are known. What is unfavorable is the endothermic character of the process. The high temperatures which are needed for the reaction can be obtained by the combustion of fossil fuels. However, this is exceptionally disadvantageous since the combustion of the fossil fuels again forms carbon dioxide. This is likewise true for the process of steam reforming.

For the performance of the process according to the invention, the use of heat or energy sources which cause negligible carbon dioxide emission, if any, are preferable. Such heat or energy sources are known and may, for example, be the following: water, wave and tidal power plants, nuclear-operated heat sources, geothermal heat sources, solar heat sources, heat sources which are operated by chemical reactions and do not produce any carbon dioxide—for example by the combustion of hydrogen.

In a preferred embodiment, the process according to the invention is performed with incorporation of solar energy, since sufficiently high temperatures for the performance of the chemical reactions and individual process steps can be provided by means of solar energy.

In the above-described processes for dry reforming using solar energy, an evident disadvantage is that, through the sole use of the solar heat source, exclusively utilization of the process in daytime during the hours with sufficient solar radiation is possible. This is a great disadvantage of the present process since the use of such a process in twenty-four hour operation is impossible as a result.

However, coupling with the exothermic reaction of partial oxidation of alkanes to hydrogen-rich synthesis gas allows nighttime operation to produce hydrogen-rich synthesis gas to be ensured. This nighttime operation can likewise be effected by the firing with intermediately stored hydrogen.

In the process according to the invention, the synthesis gas generated is to the preparation of, for example, dimethyl ether, methanol, long-chain hydrocarbons (for example with the formula $(CH_2)_nH_2$) and/or cyclic hydrocarbons (for example of the formula $(CH_2)_n$) in the range from $C_6$ to $C_{60}$, and also for preparing olefins with one or more conjugated or nonconjugated C=C double bonds, and aromatics, for example benzene, toluene, xylenes, ethylbenzene, styrene, naphthalene. Examples in this context also include ethylene, propylene, butenes, butadiene, cyclohexene. The preparation of chemicals which comprise heteroatoms, such as alcohols, ketones or organic acids, is also included in the process.

The preparation of mixtures or the parallel preparation of such above-mentioned components also corresponds to the process according to the invention. If more hydrogen is produced in individual operating steps of the process than is required for preparation of the abovementioned components, this hydrogen which is no longer required is then separated and stored. The hydrogen stored can be utilized by supplying it to the operation during the hours with insufficient solar radiation, for example in the following manner:

1) supplying thermal energy to the dry reforming of carbon dioxide by combusting hydrogen,
2) reacting carbon dioxide directly with the hydrogen,
3) adjusting the stoichiometry of the synthesis gas formed in the dry reforming in favor of hydrogen-richer mixtures.

In addition to the production of the synthesis gas from the dry reforming of carbon dioxide, the synthesis gas can also be produced by the partial oxidation of natural gas or other paraffinic gases according to the general formula:

$$C_nH_{2n+2} + n/2 O_2 \rightarrow nCO + n+1 H_2$$

Since the above-described reaction of partial oxidation is exothermic, an additional supply of energy is unnecessary. The reaction of partial oxidation thus constitutes a means of producing hydrogen-rich synthesis gas during the time within which insufficient solar radiation, if any, is available.

During the time with sufficient solar radiation, which is referred to as daytime operation in the context of the present document, the dry reforming of carbon dioxide and steam reforming can be performed in a combined reactor system or a plurality of separate reactor systems, these reactors being fed with solar energy. The solar energy can be used directly as radiative energy to heat the reactor or be supplied by means of media such as gases, liquids or melts of, for example, salts or metals, which have been heated using solar energy.

The synthesis gas which forms can then be sent to an operation for producing the abovementioned products of value, for example dimethyl ether, methanol, long-chain hydrocarbons with, for example, the formula $(CH_2)_nH_2$ and/or cyclic hydrocarbons with, for example, the formula $(CH_2)_n$ in the range from $C_6$ to $C_{60}$, for preparing olefins with one or more conjugated and/or nonconjugated C=C double bonds, for example ethylene, propylene, butenes, butadiene, cyclohexene, for preparing aromatics, for example benzene, toluene, xylenes, ethylbenzene, styrene, naphthalene. The preparation of chemicals which comprise heteroatoms, such as alcohols, ketones or organic acids, is also included in the process.

To increase the plant capacity of the operation producing paraffins, for example, it is possible to use synthesis gas of suitable stoichiometry from sources other than dry reforming. Preference is given to those operations and sources in which an excess of hydrogen exists in relation to the carbon monoxide. This hydrogen is not required for the, for example, paraffinic product of value production and can be discharged from the operation and stored. One example of such a production of synthesis gas is the partial oxidation of paraffins according to the formula:

$$C_nH_{2n+2} + n/2 O_2 \rightarrow nCO + (n+1)H_2$$

During the time with insufficient solar radiation, it is likewise possible to find an alternative heat source to operate the dry reforming and the steam reforming. In the process according to the invention, for bridging purposes in the time of lack of solar radiation, it is possible to use combustible gases, for example hydrogen from the excess of synthesis gases of suitable stoichiometry from sources other than dry reforming or partial oxidation. The hydrogen preferably originates from those operations and sources in which an excess of hydrogen exists in relation to the carbon monoxide in the synthesis gas production.

This hydrogen is, as described above, not required for the production of paraffinic products of value and can be discharged from the operation and stored. This hydrogen can be used for carbon dioxide-neutral heat production or direct heating of the reactor for dry reforming of carbon dioxide. In alternative scenarios, the hydrogen can be used directly for reduction of carbon dioxide to form carbon monoxide and water. This allows the dry reforming also to be conducted in the hours with insufficient solar radiation, without fossil energy being required here to maintain the operation.

In a preferred embodiment of the process, the synthesis gas obtained is used to produce products of value. The processes used here are suitable for producing products, for example dimethyl ether, methanol, long-chain hydrocarbons (for example with the formula $(CH_2)_nH_2$) and/or cyclic hydrocarbons (for example with the formula $(CH_2)_n$) in the range from $C_6$ to $C_{60}$, and for preparing olefins which may also comprise one or more double bonds, where the one or the plurality of C=C double bonds may be conjugated or nonconjugated, and for preparing aromatics, for example benzene, toluene, xylenes, ethylbenzene, styrene, naphthalene. Examples of the preparation of olefins also include ethylene, propylene, butenes, butadiene, cyclohexene. The preparation of chemicals which comprise heteroatoms, such as alcohols, ketones or organic acids, is also included in the process.

In a preferred embodiment of the process, during nighttime operation, it is also possible to use renewable energy sources to perform the dry reforming of carbon dioxide and the steam reforming. For example, it is possible to utilize energy which originates from geothermal sources or nuclear sources, or else energy which is produced by means of water or wind power. In a further preferred embodiment of the process, the dry reforming and the steam reforming are performed during nighttime operation with energy which is generated on the basis of chemical reactions.

According to the above description, the process according to the invention comprises three or more chemical component reactions which are performed in separate or common reactors. The three individual component reactions are:

The dry reforming of carbon dioxide according to reaction equation (1):

$$CO_2 + CH_4 \rightarrow 2CO + 2H_2 \qquad (1)$$

Steam reforming according to reaction equation (2):

$$CH_4 + H_2O \rightarrow CO + 3H_2 \qquad (2)$$

The reaction enthalpy for reaction (1) is +248 kJ/mol and that for (2) is +206 kJ/mol. The energies to be expended per unit methane are thus similar, whereas significantly different energies have to be expended per unit hydrogen.

The partial oxidation of methane with air or oxygen (3):

$$CH_4 + \tfrac{1}{2}O_2 \rightarrow CO + 2H_2 \qquad (3)$$

The reaction enthalpy of (3) is slightly exothermic at −35.6 kJ/mol.

An alternative to (3) is the reaction:

$$3CH_4 + O_2 + H_2O \rightarrow 3CO + 7H_2 \qquad (4)$$

In the context of the invention, this reaction is considered to be equivalent to reaction (3), the reaction being a combination of reactions (3) and (2).

Reactions (1), (2) and (3) are detailed here by way of example with methane as the hydrocarbon. It is known and evident to the person skilled in the art that these reactions (1), (2) and (3) can also be performed with other saturated or unsaturated higher hydrocarbons or mixtures thereof. The stoichiometries of the reaction equations have to be adjusted correspondingly. The person skilled in the art is likewise aware that the use of saturated or unsaturated higher hydrocarbons and mixtures thereof affords a less favorable $CO/H_2$ ratio than in the case of use of methane.

In the context of the invention, the use of methane is preferred. Preference is likewise given to the use of mixtures which methane and higher hydrocarbons, which may be saturated, unsaturated or mixtures of saturated hydrocarbons, the methane content being higher than 70%. Especially preferred are those mixtures in which the methane content is more than 85%.

In a preferred process variant, reaction (1) is performed in the presence of water in order to prevent or to slow coke formation of the catalyst system. It is likewise preferred to obtain the energy required for reaction (1) using the following sources: solar energy, nuclear energy, geothermal energy, wind energy, hydropower, such as tidal power or power from hydroelectric plants.

Suitable preferred catalyst systems for reaction (1) include mixed metal oxides, for example perovskites, spinels or other mixed oxides of transition group or main group elements, and also supported metals and metal oxides. Suitable metals are, for example, those of the iron and platinum groups or of the group of the coinage metals, and suitable metal oxides, mixed metal oxides and mixtures of metal oxides are, for example, transition metal oxides and main group metal oxides; especially suitable are elements of group VIIIb (such as Ni, Rh, Ru). Suitable support oxides are, for example, oxides of group IVb, aluminum oxide, silicon oxide, spinels, perovskites, aluminates, silicates, carbides and nitrides, preferred support oxides also comprising titanium oxide and/or zirconium oxide. Preferred support systems are especially those which prevent sintering and coking of the active components and have sufficient steam stability.

It is likewise preferred to obtain the energy required for reaction (2) using the following sources: solar energy, nuclear energy, geothermal energy, wind energy, hydropower, such as tidal power or power from hydroelectric plants.

Suitable preferred catalyst systems for reaction (2) include mixed metal oxides, for example perovskites, spinels or other mixed oxides of transition group or main group elements, and also supported metals, metal oxides, mixed metal oxides and mixtures of metal oxides. Suitable metals are, for example, those of the iron and platinum groups or of the group of the coinage metals, and suitable metal oxides, mixed metal oxides and mixtures of metal oxides are, for example, transition metal oxides and main group metal oxides; especially suitable are elements of group VIIIb (such as Ni, Rh, Ru). Suitable support oxides are, for example, oxides of group IVb, aluminum oxide, silicon oxide, spinels, perovskites, aluminates, silicates, carbides and nitrides, preferred support oxides also comprising titanium oxide and/or zirconium oxide. Preferred support systems are especially those which prevent sintering and coking of the active components and have sufficient steam stability.

In a preferred process variant, reactions (1) and (2) are performed in coupled or common reactor systems over one or more catalysts. Coupled reactors are reactors connected in series. A common reactor system is understood to mean an integrated reactor system, wherein gradients in relation to pressure, temperature, flow and reactant composition can be implemented within this reactor system. It is likewise also possible to use more than one catalyst system for the reactions in the common reactor system.

In another and preferred embodiment, the individual process steps of dry reforming, steam reforming and partial oxidation are performed in different reactors.

In yet another and also preferred embodiment, two of the three process steps of dry reforming, steam reforming and partial oxidation are performed in a common reactor, the common reactor being connected in series or parallel with that reactor in which the third process step is undertaken.

One advantage of the process according to the invention is present especially when the process steps of dry reforming, steam reforming and partial oxidation are performed within a similar temperature range and preferably at the same temperature. If the three reactions, in a preferred embodiment of the process according to the invention, are performed in the same reactor, it is then possible to switch from one to another reaction without additional heat losses arising as a result of heating or cooling. This allows production shutdowns which otherwise occur during cooling and heating operations to be substantially avoided.

In a preferred embodiment, the process steps of dry reforming, steam reforming and partial oxidation are performed in a common reactor.

It is likewise preferred that the energy required for reactions (1) and (2) is obtained using the following sources: solar energy, nuclear energy, geothermal energy, wind energy, hydropower, such as tidal power or power from hydroelectric power plants.

Combined performance of reactions (1) and (2) using methane or higher alkanes and under the boundary condition of obtaining a particularly preferred synthesis gas with a carbon monoxide to hydrogen ratio of 1 to 2 ($CO/H_2$ equal to 1:2) follows the general formula:

$$CO_2 + (3n-1)H_2O + 3C_nH_{2n+2} \rightarrow (3n+1)CO + (6n+2)H_2 \quad (5)$$

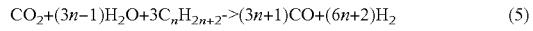

A further preferred process variant is the operation and the design of the reactions (1) and (2) in coupled or common reactor systems over one or more catalysts in such a way as to obtain a synthesis gas with the $CO/H_2$ ratio of 0.2 to 0.8, more preferably of 0.3 to 0.7, most preferably of 0.4 to 0.6.

Suitable preferred catalyst systems for the process variant of reactions (1) and (2) in coupled or common reactor systems are metal oxides, mixed metal oxides and mixtures of metal oxides, for example perovskites, spinels or other mixed oxides of transition group or main group elements, and supported metals and metal oxides. Suitable metals are, for example, those of the iron and platinum groups, or of the group of the coinage metals. Suitable metal oxides may, for example, be transition metal oxides and main group metal oxides; especially suitable are the elements of group VIIIb (such as Ni, Rh, Ru). Suitable support oxides are, for example, oxides of group IVb, aluminum oxide, silicon oxide, spinels, perovskites, aluminates, silicates, carbides and nitrides, preferred support oxides also comprising titanium oxide and/or zirconium oxide. Especially preferred are those support systems which prevent sintering and coking of the active component and have sufficient steam stability.

In a preferred process variant, reactions (1) and (2) are performed with supply of energy which originates form a solar source in order to conduct the reactions during the period of sufficient solar radiation (i.e. daytime operation). During that period within which sufficient solar radiation is unavailable (i.e. nighttime operation), the performance of reaction (3) provides a synthesis gas of equal or similar stoichiometry. In a preferred process variant, the waste heat can be utilized or stored for the operation of reactions (3) in daytime operation. In a further preferred process variant, the waste heat from the operation of reaction (3) can be utilized for partial load operation of reactions (1) and (2) during nighttime operation.

Suitable preferred catalyst systems for reaction (3) are mixed metal oxides, for example perovskites, spinels or other mixed oxides of transition group or main group elements, and also supported metals and metal oxides, mixed metal oxides and mixtures of metal oxides. Suitable metals are, for example, those of the iron and platinum groups, or of the group of the coinage metals. Suitable metal oxides may, for example, be early transition metal oxides and main group metal oxides. Suitable support oxides are, for example, oxides of group IVb, aluminum oxide, silicon oxide, spinels, perovskites, aluminates, silicates, carbides and nitrides, preferred support oxides also comprising titanium oxide and/or zirconium oxide. Especially preferred are those support systems which prevent sintering and coking of the active components and have sufficient steam stability.

In a further preferred process step, the synthesis gas produced by reactions (1), (2) and (3) is used to prepare methanol, dimethyl ether, dimethyl carbonate, hydrocarbons with a C content greater than $C_6$ (for example waxes, diesel, kerosene or gasoline) or other liquid, solid or gaseous chemicals which can serve as fuels for mobile applications.

Dimensions of the Solar Power Plant:

In the case of use of methane (n=1), an endothermic reaction enthalpy of 660 kJ/mol results for (5). This reaction enthalpy can be used as the basis of the technical design for daytime operation, i.e. 165 kJ/mol have to be expended per unit of ($CO+2H_2$). Converted to a typical paraffin formed by means, for example, of FT reaction (Fischer-Tropsch reaction), this is 13.75 MJ/kg (CH2). When a 1 MW solar plant is made the basis and heat losses in the course of heating of the starting materials are minimized by heat recovery, this gives rise to a production rate of the mixed reforming according to (5) which allows the paraffin production of 0.3 tonne per hour, which corresponds to an annual production of approx. 2700 tonnes per year. Converted to a standard figure for the production capacity of fuels or delivery rates of mineral oil, this is 54 b/d (barrels per day) per MW of solar energy.

The production capacity of 54 b/d per MW of solar energy installed allows total production rates of 2700 b/d in the case of a 50 MW solar power plant, which corresponds to a small FT demonstration plant. In the case of a 300 MW solar power plant, production rates of 16 000 b/d are obtained, which approach those of FT production plants under construction (Chevron-NPPC joint venture in Escravos, Nigeria: 34 000 b/d).

In the case of the reaction according to (2), 43 b/d are obtained per MW of solar energy, and according to reaction (1) even 72 b/d per MW of solar energy, the reaction (1) producing too little hydrogen. On the basis of reaction (2), it is possible to produce an excess of hydrogen for nighttime operation. However, nighttime operation could also be realized by autothermal reforming (ATR) by means of reaction (3). A use of the hydrogen excess obtained during the day in combination with ATR might allow an adjustment of amounts of oxygen supplied and an additional saving of carbon dioxide formed in the ATR, since ATR does not proceed ideally according to (3) and in some cases more methane is combusted, which causes a deviation from the ideal synthesis gas mixture.

Suitable Solar Plants:

Suitable solar plants which can be used conjunction with the process according to the invention are parabolic mirror plants, solar-thermal power plants with concentration of direct radiation or solar farm power plants which consist of many parabolic trough or Fresnel collectors connected in parallel (so-called linear concentrators). Also suitable are solar tower power plants (steam power plants with solar steam raising) and solar-thermal power plants without concentration.

For example, with a parabolic mirror system whose collecting area is 2835 $m^2$ and whose collecting mirror is irradiated with solar radiation of 800 watts per $m^2$ of global radiation, a power of 1.1 MW can be achieved in the center of the solar furnace.

By means of solar tower power plants, which are usually steam power plants with solar steam raising, it is usually possible to achieve higher temperature values and a higher thermodynamic efficiency than by means of solar farm power plants. The temperatures which are manageable in a technically viable manner by means of solar power plants are approx. 1300° C. The heat carrier medium used is liquid nitrate salt, steam or hot air. Salt melts, metal melts, steam or hot air are also utilized in the case of solar melting furnaces. In this way, it is possible to generate, for example, process heat at virtually any temperature, and to utilize it to accelerate chemical processes. Solar-thermal power plants without concentration have no tracking reflectors, but utilize all of the incident radiation from the sun (global radiation, i.e. direct and diffuse radiation).

The invention claimed is:

1. A process for preparing and converting a synthesis gas, which has a plurality of different operating states consisting essentially of mutually alternating
   (i) a daytime operation and
   (ii) a nighttime operation,
   wherein:
   (i) the daytime operation comprises dry reforming carbon dioxide and hydrocarbons and steam reforming hydrocarbons to obtain a hydrogen-rich synthesis gas with a supply of renewable energy, wherein the daytime operation excludes partial oxidation of hydrocarbons, and
   (ii) the nighttime operation comprises the partial oxidation of hydrocarbons to obtain a hydrogen-rich synthesis gas wherein the nighttime operation excludes the dry reforming and the steam reforming and wherein the nighttime operation is performed when the supply of renewable energy is insufficient for the dry reforming and the stream reforming, and,
   wherein the hydrocarbons used for the dry reforming, the steam reforming and the partial oxidation are natural gas, biogas or another methane-containing gas whose methane content is higher than 70% by volume;
   wherein the synthesis gas obtained during the daytime operation or the nighttime operation is used to produce products of value.

2. The process according to claim 1, wherein the synthesis gas produced over the different operating states has an overall composition in which a ratio of carbon monoxide to hydrogen is within a range from 0.2 to 0.8.

3. The process according to claim 1, wherein the synthesis gas, based on a ratio of carbon monoxide to hydrogen, has an overall composition of 1 to 2.

4. The process according to claim 1, wherein the dry reforming, steam reforming and partial oxidation are performed in different reactors.

5. The process according to claim 1, wherein two of the dry reforming, steam reforming and partial oxidation processes are performed in a common reactor, said common reactor being connected in series or parallel with a reactor in which the third process is undertaken.

6. The process according to claim 1, wherein dry reforming, steam reforming and partial oxidation are performed in a common reactor.

7. The process according to claim 1, wherein the renewable energy supplied to the operation is solar energy, nuclear energy, geothermal energy, wind energy or hydropower generated from tidal power or power from hydroelectric plants.

8. The process according to claim 1, wherein the energy supplied to the operation during daytime operation consists essentially of solar energy.

9. The process according to claim 1, wherein the products of value produced in the operation are dimethyl ether, methanol, long-chain and/or cyclic hydrocarbons in the range from C6 to C60, olefins and/or aromatics.

10. The process according to claim 1, wherein the process reduces carbon dioxide to carbon monoxide.

11. The process according to claim 10, comprising utilizing one of methane-containing hydrocarbon compounds and carbon dioxide to produce the synthesis gas.

12. The process according to claim 1, wherein the daytime operation is an endothermic operation and the nighttime operation is an exothermic operation.

13. The process according to claim 1, where the nighttime operation to produce a hydrogen-rich synthesis gas consists of one or more exothermic reactions.

14. The process according to claim 1, where the daytime operation to produce a hydrogen-rich synthesis gas consists of one or more endothermic reactions.

15. The process according to claim 1, wherein the partial oxidation of hydrocarbons is carried out with a catalyst wherein the catalyst is selected from the group consisting of oxides of group IVb, aluminum oxide, silicon oxide, spinels, perovskites, aluminates, silicates, carbides and nitrides, titanium oxide, zirconium oxide and a mixture thereof.

16. The process according to claim 1, wherein the partial oxidation of hydrocarbons is carried out with a catalyst wherein the catalyst is selected from the group consisting of oxides of group IVb, silicon oxide, spinels, perovskites, silicates, carbides and nitrides, titanium oxide, zirconium oxide and a mixture thereof.

17. The process according to claim 1, wherein the hydrogen-rich synthesis gas obtained from the daytime operation has a CO/H2 ratio in a range of from 0.2 to 0.8.

* * * * *